(12) United States Patent
Seimetz

(10) Patent No.: US 7,220,114 B2
(45) Date of Patent: May 22, 2007

(54) EQUIPMENT AND PROCESS FOR PRODUCING A MOLDED ARTICLE

(75) Inventor: Hans-Georg Seimetz, Wadern-Wadrill (DE)

(73) Assignee: KOMAGE-Gellner Maschinenfabrik KG, Kell am See (DE)

( * ) Notice: Subject to any disclaimer, the term of this patent is extended or adjusted under 35 U.S.C. 154(b) by 202 days.

(21) Appl. No.: 10/607,847

(22) Filed: Jun. 27, 2003

(65) Prior Publication Data
US 2004/0028768 A1    Feb. 12, 2004

(30) Foreign Application Priority Data
Jun. 29, 2002  (DE) ............................... 102 29 296

(51) Int. Cl.
*B29C 43/18*  (2006.01)
*B29C 43/32*  (2006.01)

(52) U.S. Cl. .................... 425/355; 425/396; 425/468; 425/DIG. 10

(58) Field of Classification Search ................ 425/352, 425/355, 466–468, 394–396, DIG. 10
See application file for complete search history.

(56) References Cited

U.S. PATENT DOCUMENTS 4,392,800 A * 7/1983 Apuzzo ...................... 425/355
6,086,814 A * 7/2000 Krenkel et al. ............. 264/610
6,294,114 B1* 9/2001 Muirhead ................... 264/545
6,797,094 B2* 9/2004 Pacchiana et al. .......... 264/113

* cited by examiner

*Primary Examiner*—Yogendra Gupta
*Assistant Examiner*—Thu Khanh T. Nguyen
(74) *Attorney, Agent, or Firm*—Friedrich Kueffner

(57) ABSTRACT

The present invention relates to a process and equipment for producing a molded article, especially a flat molded article, which has cavities and webs between the cavities, which webs essentially join two disks, wherein the equipment includes a press mold with a die, which forms the outer circumference of the molded article, and two rams, which are arranged as a lower ram and an upper ram and form the outer surfaces of the disks. The equipment includes a segment ram integrated in the lower ram and/or in the upper ram, which segment ram has ram segments with essentially the cross-sectional shape of the above-mentioned webs, with which ram segments the segment ram moves into and engages recesses with the same cross-sectional shape in the lower ram or upper ram, and by a removable core, which can be inserted in the press mold and has the core segments that form the above-mentioned cavities, such that the spaces between the core segments in the press mold are arranged congruently with the ram segments mentioned above. To produce a ring-shaped molded article, the press mold which is used is additionally provided in an already well-known way with a mandrel that forms the inner circumference.

5 Claims, 5 Drawing Sheets

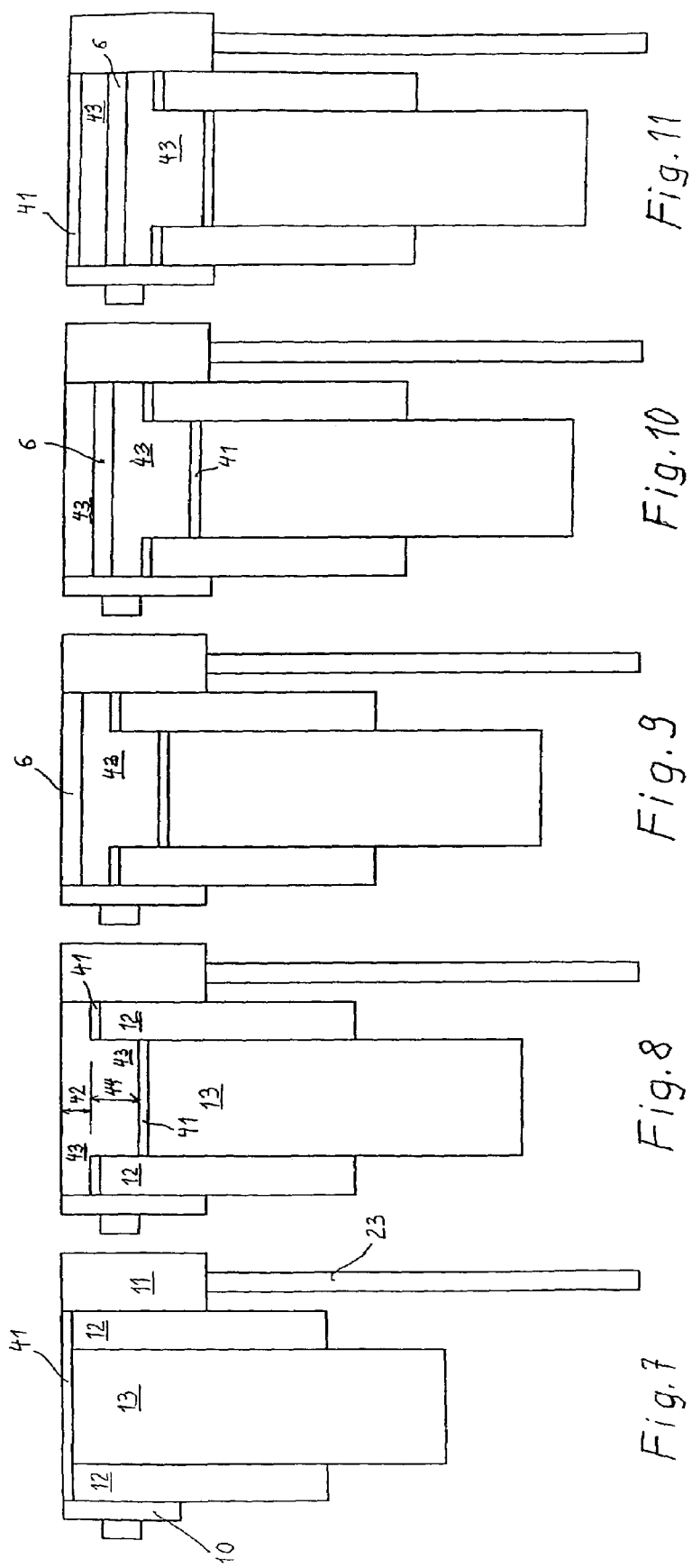

EQUIPMENT AND PROCESS FOR PRODUCING A MOLDED ARTICLE

BACKGROUND OF THE INVENTION

1. Field of the Invention

The present invention relates to equipment for producing a molded article, especially a flat molded article, which has cavities and webs between the cavities, which webs essentially join two disks, includes a press mold with a die, which forms the outer circumference of the molded article, and two rams, which are arranged as a lower ram and an upper ram and form the outer surfaces of the disks. In addition, the invention relates to a process for producing a molded article with the use of this equipment.

2. Description of the Related Art

Of primary interest here are molded articles for use as ceramic brake disks, clutch disks, friction disks, etc. A process of this type is described in EP 0 788 468 B1. However, basically the only thing to be derived from this document is the principle of using a removable core. Nothing concrete is described.

To form the cavities, the molded articles of brake disks actually produced are pressed in two disks, which are later joined, and each of which partially has the webs.

SUMMARY OF THE INVENTION

The object of the invention is to create equipment for pressing single-piece molded articles of the type mentioned above. An additional object of the invention is a process for using the equipment.

In accordance with the invention, this object is achieved, first, with equipment of the type mentioned above, which is characterized by a segment ram integrated in the lower ram and/or in the upper ram, which segment ram has ram segments with essentially the cross-sectional shape of the above-mentioned webs, with which ram segments the segment ram moves into and engages recesses with the same cross-sectional shape in the lower ram or upper ram, and by a removable core, which can be inserted in the press mold and has the core segments that form the above-mentioned cavities, such that the spaces between the core segments in the press mold are arranged congruently with the ram segments mentioned above. To produce a ring-shaped molded article, the press mold which is used is additionally provided in an already well-known way with a mandrel that forms the inner circumference.

The ram segments allow a separate compression of the molding compound in the regions of the webs, which are formed in the spaces of the core segments. Furthermore, the recesses of the lower ram and/or the upper ram, in which the ram segments are arranged, represent separate filling spaces for molding compound in the region of the webs, specifically, in a further refinement of the invention, the recesses of the upper ram by filling in the interim from the recesses of the lower ram with movement of columns of material out of some of the recesses into the others, directly or through the spaces of the core, and the latter possibly also through the molding compound for the disks. The core is generally held in the press mold only with respect to its angular position and not with respect to its height position and thus to this extent remains "floating".

For the production of a ring-shaped molded article with channels passing through it from its inner circumference to its outer circumference as the aforesaid cavities, a ring-shaped core is provided, which is centered on the die and/or the mandrel and adapted to the cross section of the press mold cavity, and in which the core segments on the outer circumference and the inner circumference are held together in grid-like fashion by narrow ring segments, such that the core can be destroyed or removed from the molded article by taking it apart. The ring segments referred to above leave behind flat grooves on the inner circumference and outer circumference of the molded article, which are not desired, but also do not cause any trouble and can later be removed by machining.

The removable core could be realized by detachable connection of its parts on the outer and inner circumference of the ring-shaped core and possibly also in the interior and could then be removed towards the outside and towards the inside. The design of the cavities could be slightly altered and adapted for the removal.

However, a removable core could also consist of core parts that could be removed from the molded article towards the outside and/or towards the inside, for which core parts moving devices are provided, by means of which the core parts can be pushed forward like a mandrel out of the die and can be drawn back into and towards the outside behind the die or into the mandrel, possibly even along curved paths.

The press mold is to be built into a press frame in the usual way and filled by means of slide valves. Metering can also be carried out gravimetrically, i.e., the filling slide valve can be charged with a weighed amount. In the case of volumetric metering, the space in the die freed in each case by the lower ram and possibly the bottom segment ram is simply filled to the edge.

As the process in accordance with the invention for producing a molded article with the use of equipment in accordance with the invention, it is proposed that the amount of molding compound provided for the webs, possibly with the exception of an amount taken up by the spaces in the core, is filled into the recesses of the lower ram with the lower segment ram drawn back relative to the lower ram and is partially transferred into the recesses of the upper ram by pushing forward the lower segment ram with the upper ram lowered, and the molding compound is later discharged from the recesses by simultaneously pushing forward the lower and upper segment ram, and, finally, the molded article is compressed by simultaneously pushing forward the lower ram and the upper ram. This process can be carried out in various variants:

In a first variant, the amount provided for the webs, with the exception of the amount taken up by the spaces in the core, is completely filled into the recesses of the lower ram in one operation, the amount provided for one of the disks referred to above, possibly with the exception of a previously introduced lining compound is filled in over it, preferably in the same operation, and over that the core is inserted. The spaces of the core are then filled, and the amount provided for the other disk is filled in over it, preferably in the same operation, and then the transfer into the recesses of the upper ram is carried out by moving columns of material within the filling and in the spaces of the core, essentially still without compression. Here, columns of material are thus moved upward within the entire filling, namely, from the said recesses in the lower ram into the molding compound for one of the disks, from this into the spaces of the core segments, from these into the molding compound for the other disk, and from this into the respective recesses of the upper ram. At the end of this step, preferably essentially the same amount of molding compound is present in said recesses above the core as below the core. Since displacements of the molding compound occur here between the fills that form the disks and the webs, the amounts associated with them, which remain constant, are considered in each case. The amount of a lining compound is viewed as part of the amount provided for the given disk.

In the first variant described above, to produce a molded article with a surface lining, the lining compound for one of the disks is first filled in over the continuously flat surface of the lower ram, and then the lower segment ram is lowered, such that the height of the recesses of the lower ram that are to be filled remains the same in and next to the recesses due to the same layer thickness of the lining compound, and/or, finally, the lining compound for the other disk is filled in.

In a second variant, the amount provided for the webs, with the exception of the amount taken up by the spaces of the core, is initially only partially filled into the recesses of the lower ram, and then, with the upper ram placed on the lower ram, this portion is transferred into the recesses of the upper ram, and the material is compressed to the point that it is held in the recesses of the upper ram; the upper ram is then pulled up, and the other portion of the amount is filled into the recesses of the lower ram, the amount provided for one of the disks is filled in over this, and the core is inserted over that; the spaces of the core are filled, and the amount provided for the other disk is filled in over it. The specified amounts are understood possibly to take into account a lining compound.

In a third variant, the amount provided for the webs, possibly with an addition or a deduction, is completely filled into the recesses of the lower ram in one operation, and the core is inserted over that, or the amount is also filled into the spaces of the inserted core; the subsequent simultaneous discharge of the molding compound from the recesses of the lower ram and the upper ram is undertaken with compression into the spaces of the core in such a way that the molding compound is held in the spaces, and the core is removed to allow the amount provided for one of the disks to be filled in and is then reinserted, and the amount provided for the other disk is filled in over it. With the said addition, extensions beyond the webs and into the disk occur (which is then to be considered a deduction in regard to the amounts provided for these). The extensions cause meshing with the disk and above all a displacement in the fiber structure of the molded article, if it is produced, as preferred, with the use of carbon fibers. The said deduction represents the reverse, with the same result. It requires that the ram segments can be moved beyond the surfaces of the lower ram and the upper ram.

In accordance with another manner of operation in accordance with the invention, it is provided that the amount of molding compound provided for one of the disks is filled in over the continuously flat surface of the lower ram in one or more operations and compressed, the core is inserted, the amount of molding compound provided for the webs is introduced into the spaces of the core in several operations and compressed by the segment ram of the upper ram, and then the amount provided for the other disk is filled in in one or more operations and compressed. In this regard, pieces of reinforcing fabric, at least two all together, can be inserted between the introduction of different layers. For this manner of operation, the ram segments can likewise be pushed forward beyond the surface of the upper ram. The lower ram does not require an integrated segment ram.

The process of the invention is intended above all for carbon molding compounds that have been treated with carbon fibers and that contain binders, which are later carbonized by a heat treatment in a nonoxidizing atmosphere; possibly, the carbon molding compound may then be partially or completely converted to silicon carbide by infiltration of liquid silicon into the porous body and another heat treatment, with retention of the carbon fibers, which are up to 18 mm long. However, a first heating still occurs under pressure in the press mold in order to solidify the molded articles.

The binders are generally thermosetting resins, such as phenol resins. The specified first heating for hardening the binder reaches, e.g., 170–180° C. or higher. The solidification begins at about 135° C. The carbonization is carried out at about 750–1,100° C.

The destroyable core preferably consists of a pyrolyzable thermoplastic, whose melting point is above the curing temperature of the specified binder. The thermoplastic can be melted out of the molded article in the course of the carbonization treatment and collected, e.g., at 250–280° C. The collected amount is pyrolyzed separately at higher temperatures.

The destroyable core could also consist of a metal with a low melting point. A core that can be removed from the molded article by pulling it apart would consist, for example, of aluminum or steel.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 7 to FIG. 15 graphically show the manner of operation of the press in a section corresponding to the left half of FIG. 5.

DETAILED DESCRIPTION OF THE INVENTION

The molded article to be produced is labeled 1. It has a flat-annular shape. In its center, with respect to the thickness of the disk, channels 2 run from the inner circumference to the outer circumference. Accordingly, the molded article consists essentially of two disks 3, 4, which are connected by webs 5 that remain between the channels 2.

Figure 16:
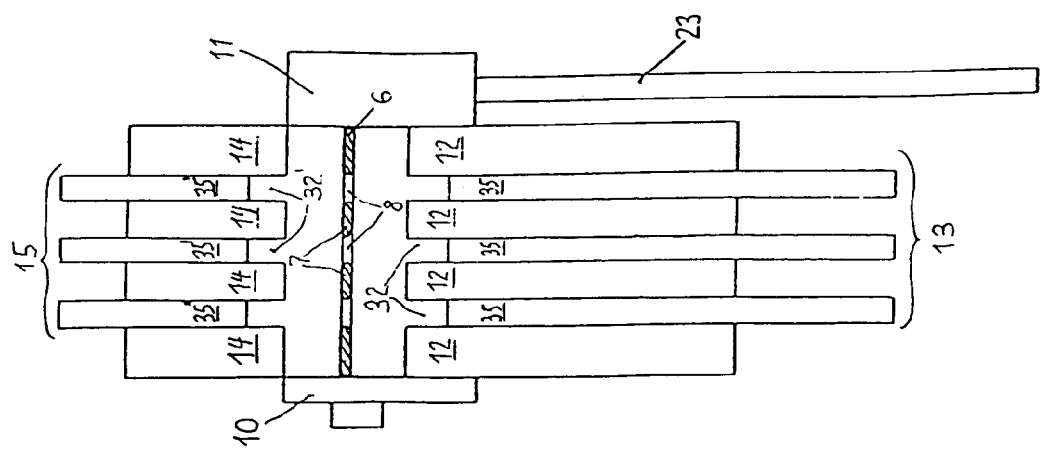
FIG. 16 graphically shows a section through the press mold along line XVI—XVI in FIG. 4 and through the core.
Figure 6:
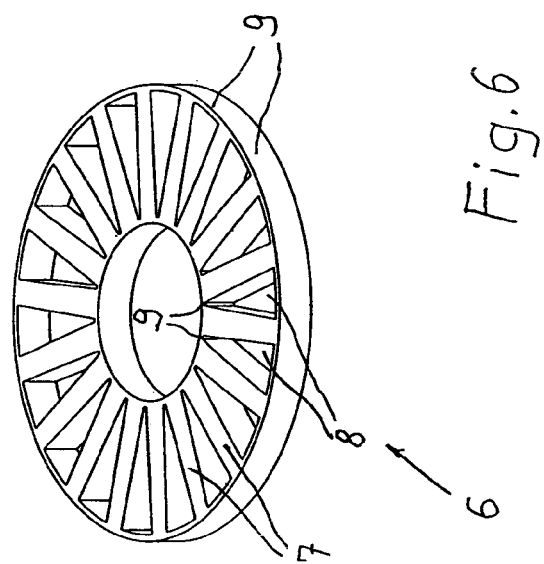
FIG. 6 shows a core in top view.
Figure 1:
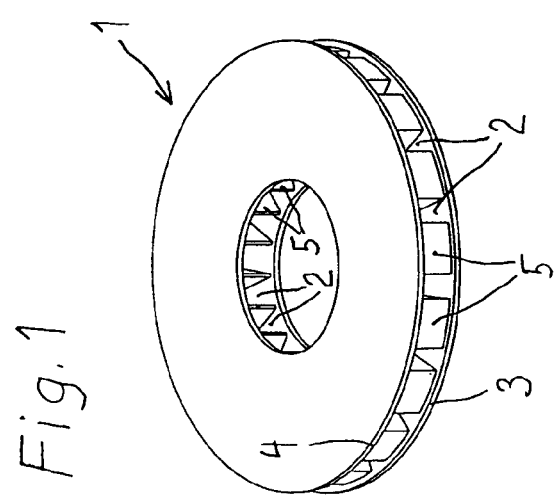
FIG. 1 shows an isometric drawing of a molded ceramic brake disk.

The shape of the channels 2 and webs 5 is evident from FIG. 6. The core 6 shown in FIG. 6 has the channels 2 in the form of core segments 7 and the webs 5 in the form of spaces 8. The core segments 7 are connected on the inner circumference and on the outer circumference by narrow ring segments 9.

Figure 3:
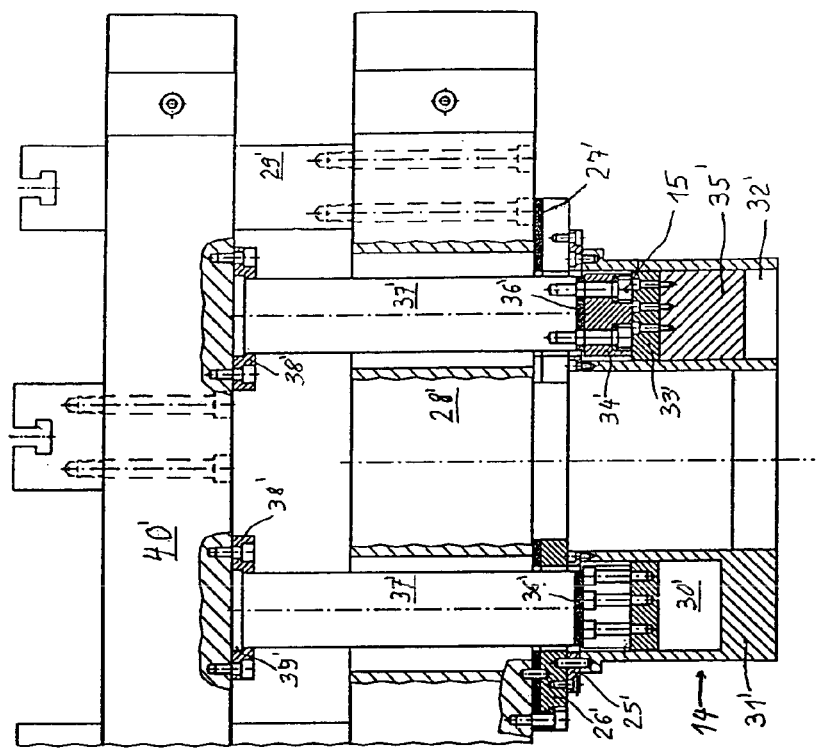
FIG. 3 shows the upper section of the press equipment and the press mold in vertical section.
Figure 5:
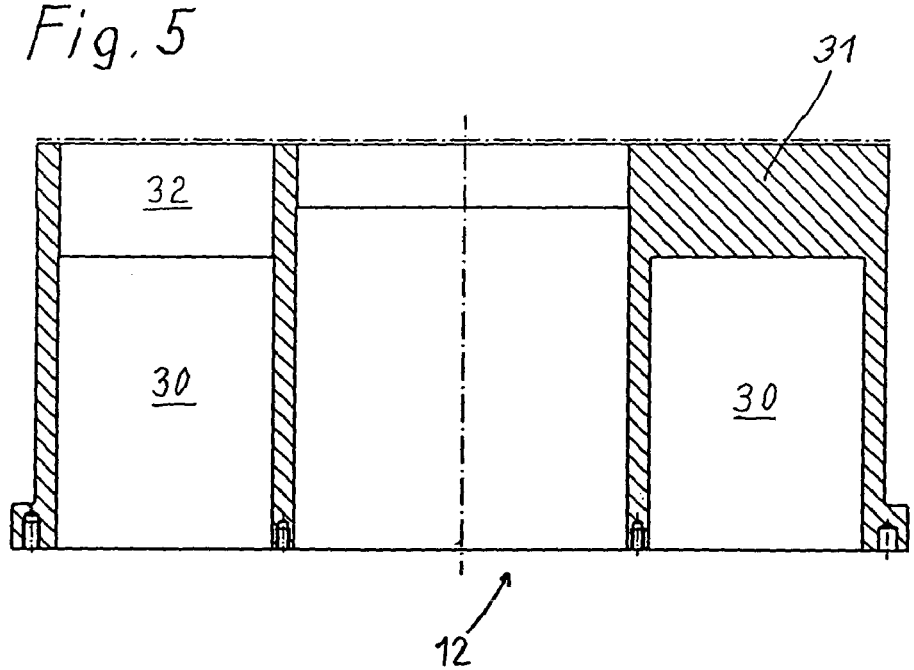
FIG. 5 shows the lower ram in a vertical section along line V—V in FIG. 4.
Figure 4:
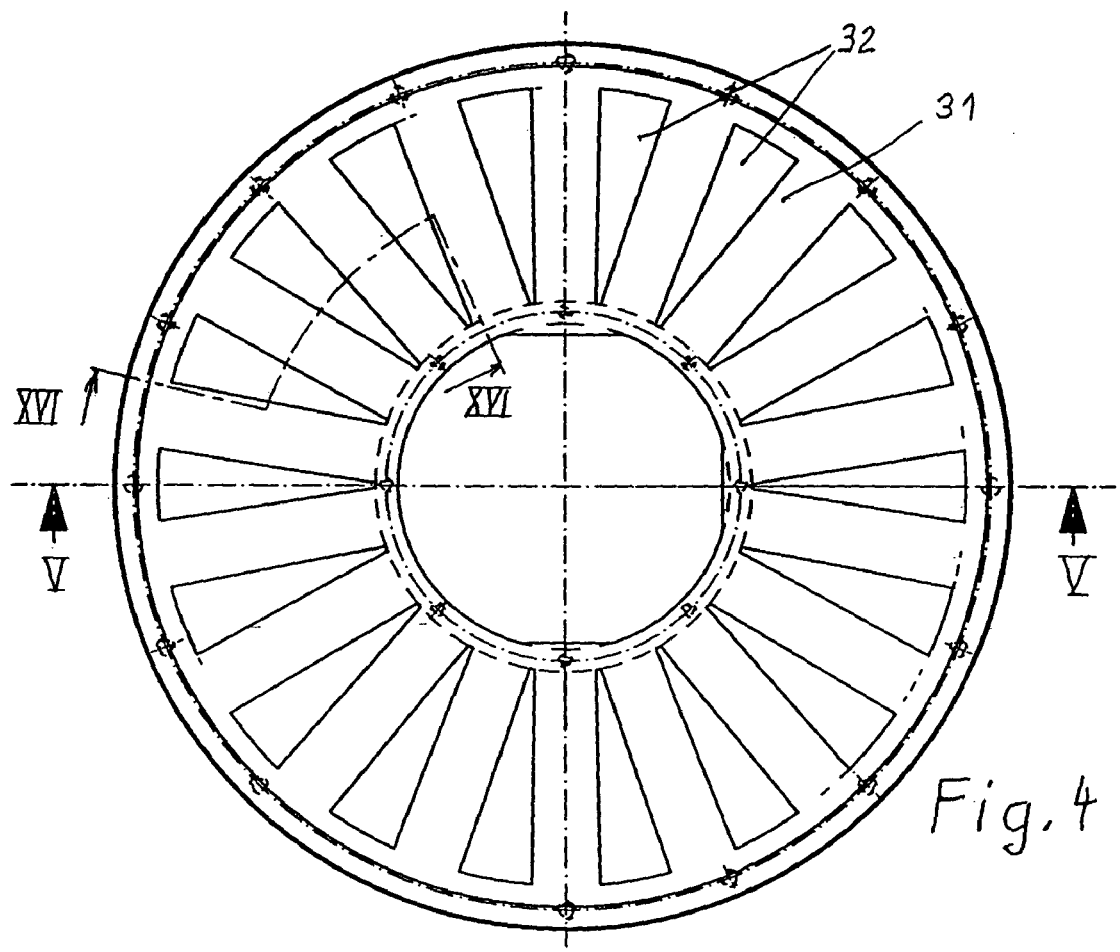
FIG. 4 shows the lower ram of the press mold in top view.

The press mold used to produce the molded article 1 consists of a die 10, a mandrel 11, a lower ram 12, a lower segment ram 13, an upper ram 14, and an upper segment ram 15. Parts 10 to 13 appear in FIG. 2, and parts 14 and 15 appear in FIG. 3. The lower ram 12 itself is also shown in FIGS. 4 and 5.

The die 10 has the form of a flat hollow cylinder and forms the outer wall of the press mold. It is mounted as a stationary part. It is seated in a supporting ring 16 in the manner shown in the drawing. The supporting ring is supported in the stationary die table with an interposed insulating disk 17 for electrical insulation. The screw joint 19 for this is covered by another insulating disk 20 and a ring 21 that closes the surface of the table.

As the counterpart to the die 10, the mandrel 11 forms the inner wall of the ring-shaped press mold at the same height as the die. It is designed as a cylinder consisting of solid material with a wear-resistant outer jacket 22. It is also mounted as a stationary part, namely, on a multiply composed column 23 with electrical insulation by an insulating plate 24 installed between two sections of the column.

The lower ram 12 fills the ring cross section between the die 10 and the mandrel 11 and can be moved up and down in it. It is supported on a plate 28 of the press by a union ring 25, a power supply plate 26, and an insulating disk 27 and is screwed together with the plate 28 of the press, which is connected by columns 29 with the lower ram of the press.

The lower ram 12 is made of solid material. Along the lower, larger portion of its height, it has an annular cavity 30. In the solid material 31 stopped above it, vertical shafts 32 that pass through it are worked out. In horizontal cross section (see top view, FIG. 4), the shafts 32 have the same arrangement and more or less the same shape as the spaces 8 in the core 6.

Figure 2:
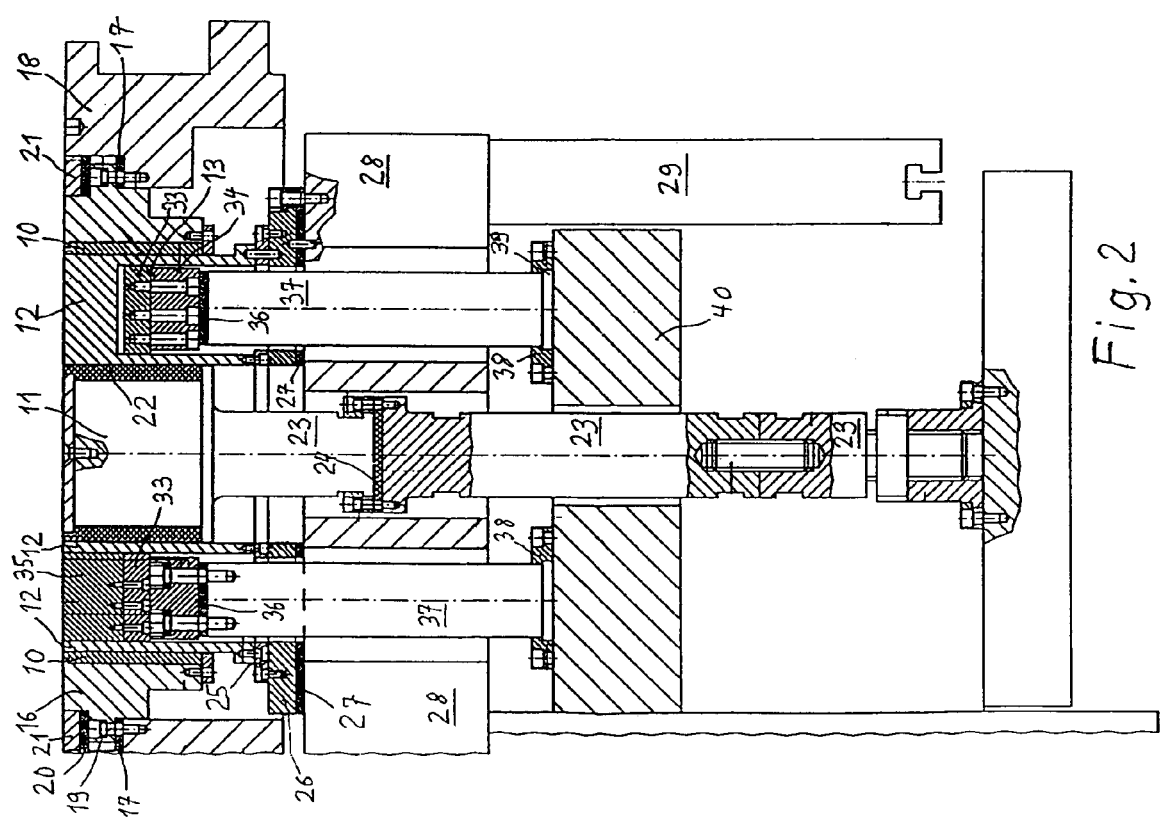
FIG. 2 shows the lower section of a piece of press equipment and a press mold in vertical section.

The lower segment ram 13 consists of two rings 33 and 34 made of solid material, which are screwed together, and of ram segments 35 that are placed on the upper ring 33 and screwed together with it. The lower ring 34 is supported on four columns 37 with interposed insulating plates 36 and screwed together with the columns 37. The columns 37 stand on another plate 40 of the press with bases 39 that are overlapped by a supporting ring 38. The plate 40 is connected with another lower ram of the press. The rings 33 and 34 have room in the cavity 30 of the lower ram 12. The segments 35 project into the shafts 32 and fill their cross section. In the lower end position of the segment ram 15, they form a base that closes the shafts 32 towards the bottom, and in the upper position, they stop flush with the surface of the lower ram 12. This position is shown in FIG. 2. However, they may also be pushed even beyond this point. The upper ram 14 and the upper segment ram 15 are designed and arranged with mirror symmetry to the lower ram 12 and the lower segment ram 13. The parts of the upper ram 14 and the upper segment ram 15, which correspond to parts 25 to 40, are labeled with the same reference numbers except for the addition of. The only differences are that the columns 29' and 37' are smaller than the columns 29 and 37 and are connected with upper rams of the press.

The power supply plates 26 and 26' are connected to connections (not shown), each of which has a large number of power supply lines, which are able to follow the movements of the lower ram 12 or upper ram 14.

In the present example, the equipment described above is operated by the first process variant specified earlier.

This is done in an otherwise known way in a known press frame with two lower rams, two upper rams, and two slide valves for the molding compound and the lining compound. However, the metering is carried out gravimetrically by charging the slide valve with weighed amounts.

FIGS. 7 to 15 show graphically, to illustrate the amounts introduced, filling of the press mold to the edge, as in volumetric metering, i.e., with suitably lowered lower ram 12 and lower segment ram 13, filling up to the upper edge of the die 10 and the mandrel 11. In fact, however, the given amount is introduced with the lower ram 12 further lowered and is then uniformly distributed by a tool applied to the press mold with blades that rotate in the annular mold cavity. The slide valves have the same annular cavity cross section as the press mold. Although the molding compound is granulated, due to its content of carbon fibers, it can be reliably controlled only with this sort of great effort.

In addition to FIGS. 7 to 15, FIG. 16 is intended to facilitate the presentation.

In FIG. 7, the lower ram 12 and the lower segment ram 13 are drawn back from the upper edge of the die 10 and the mandrel 11 by the filling height of a friction lining compound 41. The upper surfaces of the ram segments and the lower ram lie in the same plane.

In FIG. 8, the lower ram 12 and the lower segment ram 13 have been drawn back further and by different amounts. The filling height 42 above the lower ram 12 corresponds approximately to the amount of molding compound 43 provided for one of the disks 3 of the molded article 1. The filling height 44 above the lower segment ram 13, i.e., in the shafts 32, corresponds approximately to the amount of molding compound 43 provided for the webs 5, less the molding compound introduced into the spaces 8 of the core 6 in FIG. 11. The additional molding compound is located at the site of the webs to be molded.

In FIG. 9, the lower ram 12 and the lower segment ram 13 have been further lowered by the same amount. The core 6 has been inserted above the charge of molding compound 43.

In FIG. 10, the lower ram 12 and the lower segment ram 13 have been lowered still further by the same amount. The filling height above the core 6 now corresponds approximately to the amount of molding compound 43 provided for the other disk 4 of the molded article 1. When this amount has been introduced, the spaces 8 of the core have also been filled with molding compound 43, as was noted earlier in connection with FIG. 8.

In FIG. 11, the lower ram 12 and the lower segment ram 13 have been lowered again by the same amount, and a friction lining compound 41 for the other side of the molded article 1 has been introduced.

Figure 12:
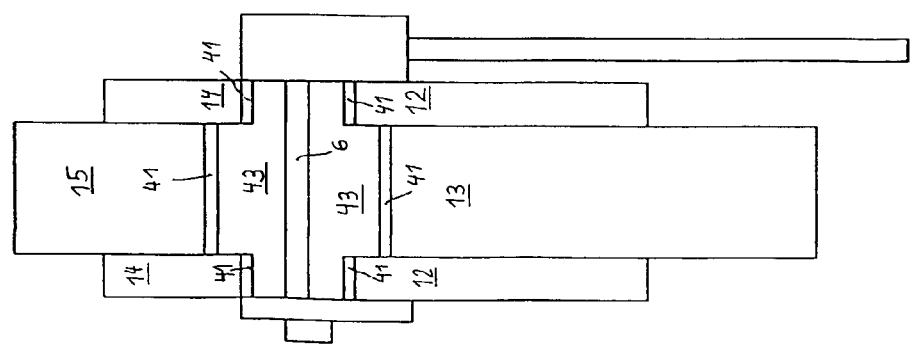

In FIG. 12, the upper ram 14 has been lowered onto the friction lining compound 41, and the lower segment ram 13 has been raised. During this raising operation, columns of material essentially from the cross section of the shafts 32 and 32' and the spaces 8 of the core 6 were moved upward with movement all the way through the spaces 8. There is now just as much molding compound 43 in the shafts 32' as in the shafts 32. The upper segment ram 15 had been lowered onto the friction lining 41 together with the upper ram 14 and has been raised synchronously with the lower segment ram 13. It could also have had the position in the upper ram 14 according to FIG. 12 in advance.

Figure 13:
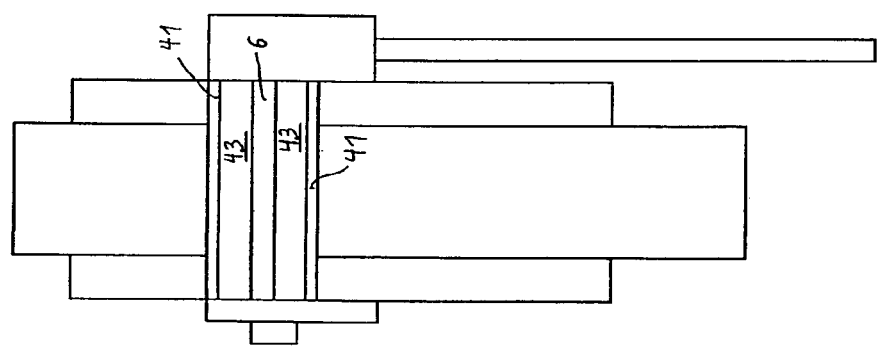

In FIG. 13, the lower segment ram 13 and the upper segment ram 15 have been advanced and have thus compressed the aforementioned columns of material. The surfaces of the ram segments 35 and 35' are now aligned with the surfaces of the lower ram 12 and upper ram 14, respectively.

Figure 14:
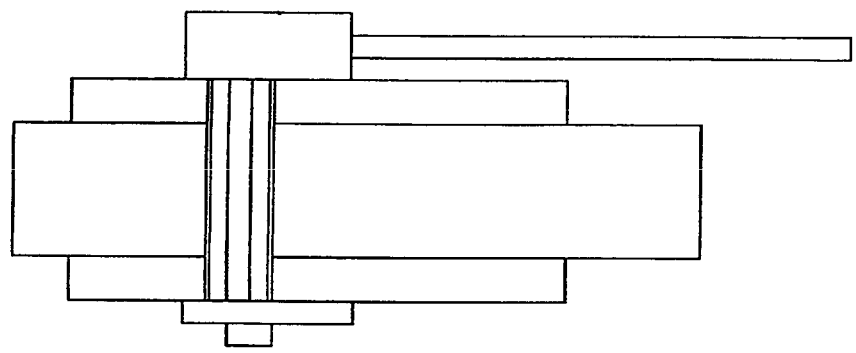

In FIG. 14, the lower ram 12 with the lower segment ram 13 and the upper ram 14 with the upper segment ram 15 have been equally advanced as far as the end position. The upper ram 14 has penetrated into the press cavity between the die 10 and the mandrel 11. The molded article is now compressed to its final size.

The advancing of the segment rams 13, 15 into the two rams 12, 14 and the advancing of the rams 12, 14 could have been carried out simultaneously or with some overlapping in time instead of at different times. Of course, compression at different times of the columns of material that form the webs 5 in the molded article and of the molding compound as a whole, in which the columns of material are once again compressed uniformly as part of the whole, would probably be preferable in most cases.

In the completely compressed state, the molded article is heated by applying an alternating voltage of, for example, 2–3 V between the power supply plates 26 and 26'. The current flows from the power supply plate 26 into the lower ram 12, from this into the lower disk 3 of the molded article 1, then through the webs 5 of the molded article 1 that are formed in the spaces 8 of the nonconducting core 6, from these into the upper disk 4 of the molded article, and then further through the upper ram 14 and its power supply plate 26', or in the opposite direction. If the core 6 were made of metal or some other conductive material, it would, as was found, itself heat up and the heat the webs 5 enclosed by it by heat transfer. With the selection of material specified above, i.e., carbon molding compounds treated with carbon fibers and with binders consisting of pitches and/or thermosetting resins, the molding compound 43 and the friction lining compound 41 have a conductivity that allows them to be sufficiently heated, and the binders have the ability, when heated, to cure to the extent that the compressed molding compound (which, however, shows a tendency to separate due to its fiber content) is sufficiently hardened that the molded article 1 can be further treated. The current intensity that develops at the applied voltage of 2–3 V varies within wide limits due to the changes within the molded article. It may rise to as high as 15,000 A, especially at the beginning, and later fall back to as low as 100 A. The heating is controlled by interval control, starting with a temperature measurement by a thermocouple pushed forward from one of the upper ram segments 35' into one of the webs 5.

Figure 15:
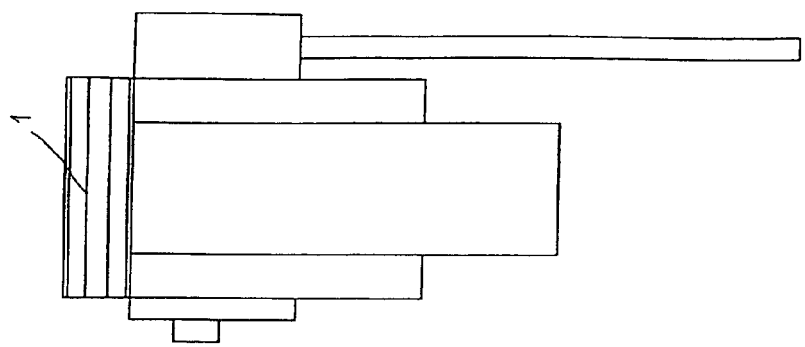

FIG. 15 shows the molded article 1 ejected from the press mold. It should be explained that FIGS. 7 to 15 are graphic representations and thus are not true to scale.

The core 6 is later destroyed in the manner specified earlier.

While specific embodiments of the invention have been shown and described in detail to illustrate the inventive principles, it will be understood that the invention may be embodied otherwise without departing from such principles.

I claim:

1. An equipment for producing a molded article, especially a flat molded article, wherein the article has cavities and webs between the cavities and two discs essentially joined by the webs, the equipment comprising
    a press mold having a die for forming an outer circumference of the molded article, and a lower ram and an upper ram for forming an outer surface of the disks;
    a segment ram integrated in at least one of the lower ram and the upper ram, wherein the segment ram has ram segments having essentially the same cross-sectional shape as the webs, wherein the segment ram moves into and engages with the ram segments recesses having the same cross-sectional shape in the lower ram or in the upper ram, and
    a removable core insertable into the press mold, the removable core having the core segments for forming the cavities, wherein spaces between the core segments in the press mold are arranged congruently with the ram segments.

2. The equipment according to claim 1, wherein, for producing a ring-shaped molded article, the press mold additionally comprises a mandrel for forming an inner circumference of the article.

3. The equipment according to claim 2, further comprising, for producing a ring-shaped molded article having channels extending therethrough from the inner circumference to the outer circumference so as to form the cavities, a ring-shaped core centered on the die or the mandrel and adapted to the cross-section of the press mold cavity, wherein the core segments on the outer circumference and the inner circumference are held together in a grid-like manner by narrow ring segments, wherein the core can be destroyed or removed from the molded article by taking it apart.

4. The equipment according to claim 1, wherein the core has core parts configured to be removable from the molded article towards the outside and/or towards the inside, further comprising moving devices for pushing the core parts out of the die or the mandrel and for drawing the core parts into and towards the outside behind the die or into the mandrel.

5. The equipment according to claim 1, wherein the surfaces of the of the ram and the segment ram integrated therein are aligned in an end position.

* * * * *